United States Patent [19]

Koichi

[11] Patent Number: 5,510,907
[45] Date of Patent: Apr. 23, 1996

[54] FACSIMILE APPARATUS HAVING URGENCY MESSAGE TRANSMISSION FUNCTION

[75] Inventor: Hiroshi Koichi, Isehara, Japan

[73] Assignee: Ricoh Company, Ltd., Tokyo, Japan

[21] Appl. No.: 305,338

[22] Filed: Sep. 15, 1994

[30] Foreign Application Priority Data

Sep. 17, 1993 [JP] Japan .................................. 5-253671

[51] Int. Cl.⁶ .............................. H04N 1/00; H04M 11/04
[52] U.S. Cl. ........................... 358/434; 358/440; 358/441; 358/436; 379/37; 379/41; 379/58; 379/67
[58] Field of Search ..................... 358/400, 403, 358/434, 435, 436, 438, 439, 440, 441, 442, 468; 379/37, 40, 41, 42, 43, 44, 58, 67, 93, 100

[56] References Cited

U.S. PATENT DOCUMENTS

| | | | |
|---|---|---|---|
| 5,008,926 | 4/1991 | Misholi | 358/403 |
| 5,189,693 | 2/1993 | Nakajima | 358/400 |
| 5,343,509 | 8/1994 | Dounies | 358/468 |

FOREIGN PATENT DOCUMENTS 63-192898 12/1988 Japan.
4222165 8/1992 Japan.

Primary Examiner—Edward L. Coles, Sr.
Assistant Examiner—Thomas D. Lee
Attorney, Agent, or Firm—Oblon, Spivak, McClelland, Maier & Neustadt

[57] ABSTRACT

A facsimile apparatus includes: a memory unit for storing subscriber number records indicating destination stations for urgency message transmission, and for storing voice and image urgency message records respectively indicating voice and image urgency messages; an operation unit for selecting one of the destination stations whose records are stored, and for selecting one of message transmit modes; a transmission starting unit for starting an urgency message transmit procedure when one of the destination stations is selected and one of the message transmit modes is selected; and a transmission unit for transmitting an urgency message to the selected destination station through a transmission line when the urgency message transmit procedure is started, the urgency message being one or both of the voice and image urgency messages in accordance with the selected message transmit mode.

9 Claims, 11 Drawing Sheets

FIG. 3

| DESTINATION | SUBSCRIBER NUMBER | | |
|---|---|---|---|
| | TELEPHONE | FACSIMILE | CONCURRENT |
| A | xxx-xxxx | — | — |
| B | — | — | xxx-xxxx |
| C | xxx-xxxx | xxx-xxxx | — |

FIG. 6

| DESTINATION | PROCESS |
|---|---|
| A | OK |
| B | NG |
| C | OK |

FIG. 7

| DESTINATION | PROCESS | |
|---|---|---|
| | VOICE MESSAGE TRANSMISSION | IMAGE MESSAGE TRANSMISSION |
| A | NG | OK |
| B | NG | NG |
| C | OK | OK |

URGENCY MESSAGE ####

HELP ME !

I'M ×× × ×××.

I'M SUFFERING A SUDDEN ILLNESS HERE.

URGENT RESCUE IS REQUESTED.

ADDRESS : 1234, ××××, "A" CITY

TEL : 9876-54-3210

PLEASE URGENTLY TELEPHONE "K" HOSPITAL

FACSIMILE APPARATUS HAVING URGENCY MESSAGE TRANSMISSION FUNCTION

BACKGROUND OF THE INVENTION

The present invention generally relates to a facsimile apparatus, and more particularly to a facsimile apparatus having a function to transmit a selected one of urgency messages to a selected one of destination stations, the urgency message transmitted and the destination station being selected by an operator at the start of an urgency message transmit procedure.

Japanese Laid-Open Utility Model Application No. 63-192898 discloses a proposed telephone device. The proposed telephone device automatically transmits a recorded voice to a destination station such as a hospital whose record is stored, when a message transmission start button is depressed by an operator. The proposed telephone device is useful for an aged person who lives alone because the recorded voice can be urgently sent to the destination station when a matter of urgency to that person has occurred and cannot operate a telephone unit.

However, in the proposed device mentioned above, the destination to which the voice message is sent is limited to a single station, and no flexibility of the destination is provided. That is, it is impossible to vary the destination station according to the kind of the urgency. Also, the proposed telephone device cannot transmit an image urgency message such as a map detailing the location of the originating station, to the destination station.

Japanese Laid-Open Patent Application No. 4-222165 discloses a proposed facsimile device. The proposed facsimile device transmits a recorded image urgency message to a plurality of destination stations by using a sequential broadcast communication function. The proposed facsimile apparatus can transmit one image message to the plurality of the destinations.

However, in the proposed facsimile device mentioned above, it is impossible to vary the destination station according to the kind of the urgency. Also, in the proposed facsimile device, the destination stations to which the image urgency message is transmitted are limited to facsimile machines, and it is impossible to transmit the message to destinations having no facsimile machines.

On the other hand, a facsimile apparatus having the urgency message transmission function may receive a call from an external facsimile station via a communication line after the urgency message transmit procedure has just started. If the facsimile apparatus automatically sends a call-accept signal back to the calling station, the proceeding of the urgency message transmit procedure by the facsimile apparatus is suspended until an image data receiving procedure with the external facsimile station is completed. In such a case, a delay of time for the urgency message transmit procedure is produced.

However, no facsimile apparatus has been proposed to take preventive measures in the case mentioned above. A conceivable method for preventing the facsimile apparatus from automatically sending a call-accept signal back to the calling station is to disconnect the facsimile apparatus from the communication line by hanging up a telephone unit of the facsimile apparatus and hanging on it. However, when the operator is suffering a sudden serious illness, it is difficult for the operator to use the telephone unit in response to a call from an external facsimile station. Thus, it is difficult to always prevent the automatic responding action of the facsimile apparatus from starting.

SUMMARY OF THE INVENTION

Accordingly, it is a general object of the present invention to provide an improved facsimile apparatus in which the above described problem is eliminated.

Another, more specific object of the present invention is to provide a facsimile apparatus having an urgency message transmission function which allows the operator to change a selected one of recorded destination stations according to the kind of the urgency and allows the operator to change a selected one of recorded voice and image urgency messages according to the equipment of the destination station.

Still another object of the present invention is to provide a facsimile apparatus having an urgency message transmission function which does not suspend an urgency message transmit procedure even when a call from an external calling station is received after the start of the urgency message transmit procedure, and suitably carries out the urgency message transmit procedure with no considerable delay of time.

The above mentioned object of the present invention is achieved by a facsimile apparatus which includes: a memory unit for storing a plurality of subscriber number records indicating a plurality of destination stations for urgency message transmission, and for storing voice and image urgency message records which respectively indicate voice and image urgency messages; an operation unit for selecting one of the plurality of destination stations whose records are stored in the memory unit, and for selecting one of a plurality of message transmit modes; a transmission starting unit for starting an urgency message transmit procedure when one of the destination stations is selected on the operation unit and one of the message transmit modes is selected on the operation unit; and a transmission unit for transmitting an urgency message to the selected destination station through a transmission line when the urgency message transmit procedure is started by the transmission starting unit, the urgency message being one or both of the voice and image urgency messages according to the selected message transmit mode.

According to the present invention, it is possible that the operator selects one of the recorded destination stations according to the kind of the urgency and freely selects one of the message transmit modes according to the equipment of the destination station. In addition, it is possible to quickly and smoothly carry out the urgency message transmit procedure with no considerable delay of time even when a call from an external calling station is received after the start of the urgency message transmit procedure.

BRIEF DESCRIPTION OF THE DRAWINGS

The above and other objects, features and advantages of the present invention will be more apparent from the following detailed description when read in conjunction with the accompanying drawings in which:

FIG. 3 is a diagram showing a list of subscriber number records stored in a memory unit of the facsimile apparatus in FIG. 1;

FIG. 6 is a diagram showing a transmitted message management table used to monitor the results of urgency message transmissions;

FIG. 7 is a diagram showing another transmitted message management table;

DESCRIPTION OF THE PREFERRED EMBODIMENTS

Figure 1:
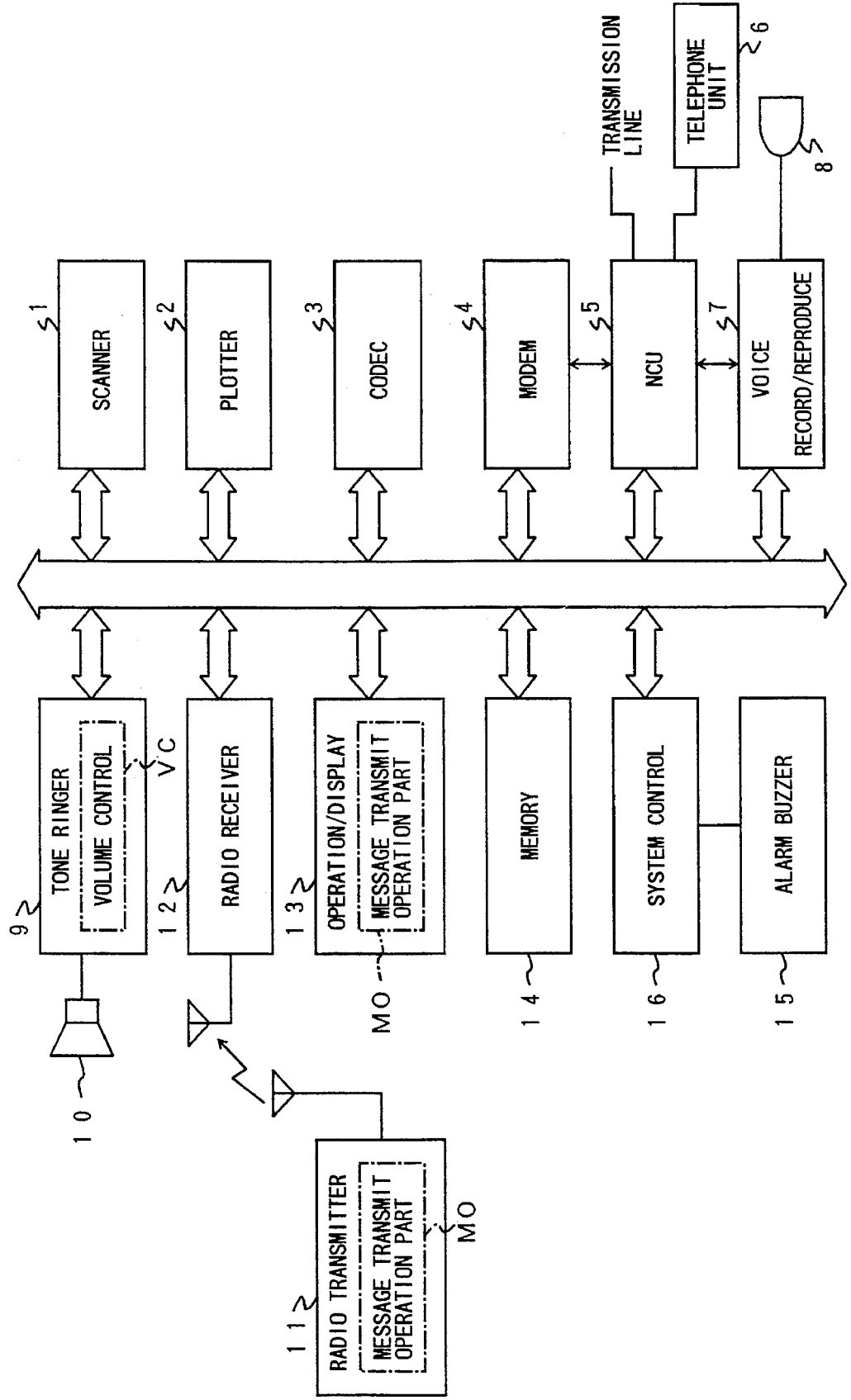
FIG. 1 is a block diagram showing an embodiment of a facsimile apparatus according to the present invention.

A description will now be given of a facsimile apparatus to which the present invention is applied, with reference to FIG. 1. FIG. 1 shows an embodiment of the facsimile apparatus according to the present invention, and this facsimile apparatus is accommodated in an operator's building.

In FIG. 1, the facsimile apparatus comprises a scanner unit 1, a plotter unit 2, a CODEC (coder/decoder) unit 3, a MODEM (modulator/demodulator) unit 4, a NCU (network control unit) 5, a voice record/reproduce unit 7, a tone ringer 9, a radio receiver 12, an operation/display unit 13, a memory unit 14, and a system control unit 16 connected with an alarm buzzer 15. All the component parts of the facsimile apparatus described above are interconnected by a system bus, and data is transferred between the component parts via the system bus.

In FIG. 1, the scanner unit 1 optically scans a document to read out image data from the document. The plotter unit 2 prints an image received from an external station, on a sheet of paper. The CODEC unit 3 provides the data compression for transmitting image signals, and provides the data decompression for reconstructing compressed image signals received into the original form. The MODEM unit 4 provides the functions of sending and receiving image data signals in accordance with data transmission protocol, and provides the functions of sending and receiving transmission control signals.

In FIG. 1, the facsimile apparatus further comprises a telephone unit 6 connected to the NCU 5, a microphone 8 connected to the voice record/reproduce unit 7, and a speaker 10 connected to the tone ringer 9.

The NCU 5 is a controller which controls connection of the facsimile apparatus to a telephone line when a call is sent to or received from an external station, and performs switching of circuits to a transmission line and the telephone unit 6 when either a facsimile transmission or a telephone communication is performed.

The voice record/reproduce unit 7 serves to record a voice message, input from the microphone 8, and serves to reproduce the recorded voice message and output it when requested. The tone ringer 9 makes a ringing sound by using the speaker 10 when a call from an external station is received. The tone ringer 9 includes a volume control part VC, and this volume control part VC is used by the user to set the level of a ringing sound of the tone ringer 9 to a desired level.

The radio transmitter 11 is a compact device which the user can carry to a location remote from the facsimile apparatus, and the radio transmitter 11 is used to transmit a signal to the facsimile apparatus from a remote location in order to start the urgency message transmit procedure by the facsimile apparatus. The radio transmitter 11 includes a message transmit operation part MO which is used by the operator to start the urgency message transmit procedure. The radio transmitter 11 transmits a signal from a remote location to the facsimile apparatus when a message transmit starting operation is performed by the user on the message transmit operation part MO, in order to start the urgency message transmit procedure by the facsimile apparatus. The radio receiver 12 attached to the facsimile apparatus receives the signal mentioned above from the radio transmitter 11, and sends it to the system control unit 16 so that the urgency message transmit procedure by the facsimile apparatus is started.

The operation/display unit 13 is used to input the document transmission and receiving instructions and display the document transmission and receiving parameters, and serves to start the urgency message transmit procedure by the facsimile apparatus. A part of the operation/display unit 13, which is composed of a plurality of control keys and a plurality of displays for performing the document transmission and receiving operations, is essentially the same as a known facsimile apparatus. The control keys allow the operator to operate the facsimile system in some way. The displays indicate operating conditions of the facsimile apparatus. Similarly to the radio transmitter 11 described above, the operation/display unit 13 includes a message transmit operation part MO which is used by the operator to start the urgency message transmit procedure by the facsimile apparatus.

The memory unit 14 is a storage device for storing a set of voice and image message records and a list of subscriber number records. The alarm buzzer 10 serves to inform anyone within the operator's building of the facsimile apparatus that the urgency message transmit procedure is started because of a matter of urgency. The system control unit 16 is a microcomputer which monitors and controls operations of each of the above component parts of the facsimile apparatus.

Figure 2:
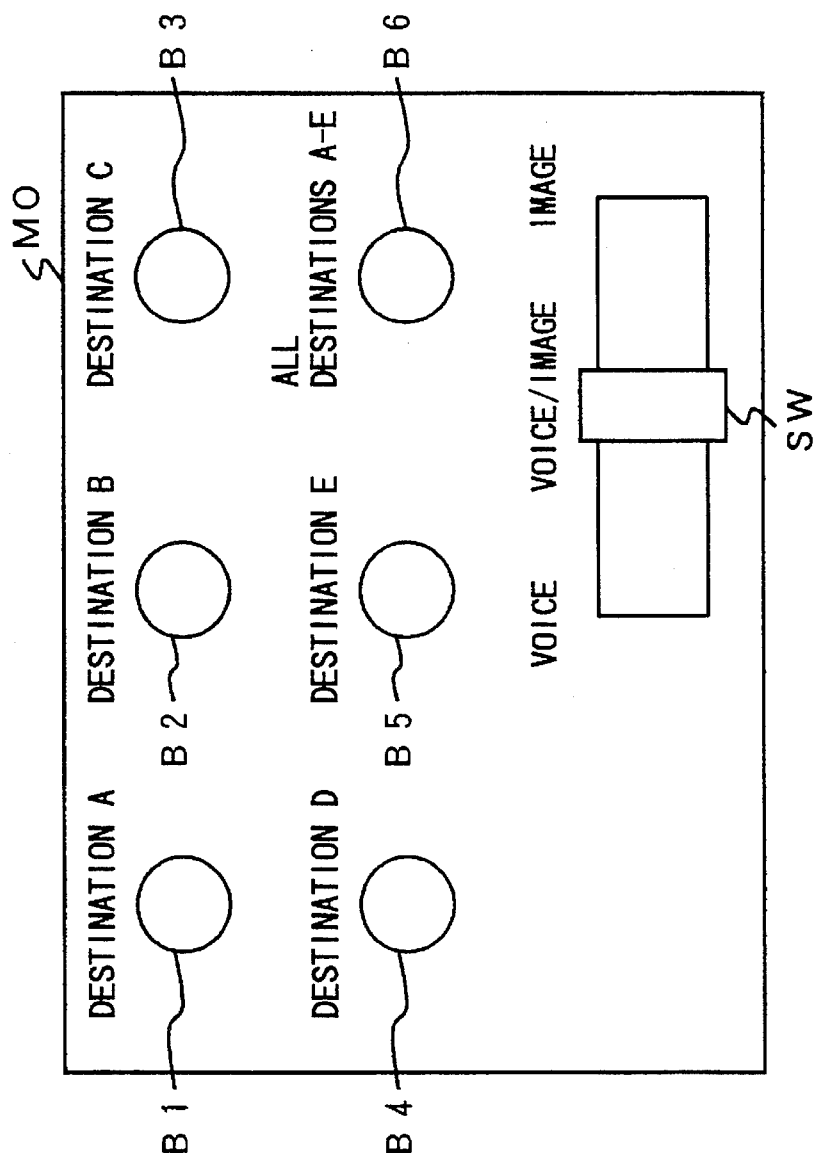
FIG. 2 is a diagram showing a message transmit operation part of the facsimile apparatus in FIG. 1.

FIG. 2 shows an example of the message transmit operation part MO of the facsimile apparatus in FIG. 1. In the embodiment of the facsimile apparatus shown in FIG. 2, five subscriber number records (which correspond to destinations A through E) at the maximum can be stored within the facsimile apparatus before the use of the facsimile apparatus. In FIG. 2, the message transmit operation part MO includes five single-destination buttons B1 through B5 for selecting a single destination and an all-destination button B6 for selecting all the destinations recorded. The message transmit operation part MO further includes a select switch SW to select one of three message transmit modes: a voice message transmit mode; an image message transmit mode; and a voice and image message transmit mode.

The facsimile apparatus described above is accommodated within the user building. Before the use of this facsimile apparatus, it is necessary that the five subscriber number records and the voice and image message records are stored in the memory unit 14 by the user. The storing of these records in the memory unit 14 is carried out by a known technique.

FIG. 3 shows a list of the subscriber number records which must be previously stored in the memory unit 14. The destinations relating to the subscriber number records mentioned above are, for example, the user's acquaintances and relatives, a police office, a hospital and a fire station located near the operator's building. In FIG. 3, each of the subscriber number records include subscriber numbers which are classified into one or two of three categories: telephone number, facsimile number, and telephone/facsimile number.

As shown in FIG. 3, when a destination A is equipped with a transmission line used by a telephone unit only, the subscriber number record thereof includes a telephone number assigned to the telephone unit. When a destination B is equipped with a single transmission line shared by a telephone unit and a facsimile unit, the subscriber number record thereof includes a telephone/facsimile number concurrently assigned to both the units. When a destination C is equipped with two transmission lines separately used by a telephone unit and a facsimile unit, the subscriber number record thereof includes both a telephone number assigned to the telephone unit and a facsimile number assigned to the facsimile unit.

The voice and image message records which must be initially stored in the memory unit 14 includes a voice urgency message record, an image transmit notice voice record, and an image urgency message record. The voice urgency message record mentioned above is to inform a person at the destination station by telephone that a matter of urgency has occurred to the operator of the facsimile apparatus and that an urgent rescue of the operator is requested. The image transmit notice voice record mentioned above is to inform a person at the destination station by telephone that an image urgency message will be transmitted shortly after the voice message and that a depression of a facsimile start button by the person is requested. These voice messages are recorded in the memory unit 14 through the voice record/reproduce unit 7.

Figure 9:
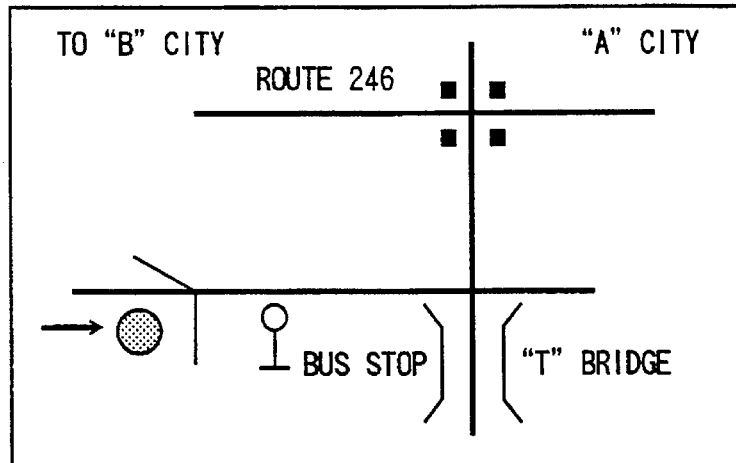
FIG. 9 is a diagram showing an example of an image urgency message transmitted by the facsimile apparatus.

The image urgency message record mentioned above is to send an image urgency message to the destination station in order to provide visual information detailing the location of the operator where a matter of urgency occurs. This image message is recorded in the memory unit 14 through the scanner unit 1. FIG. 9 shows an example of the image urgency message which is transmitted by the facsimile apparatus according to the present invention.

Figure 4:
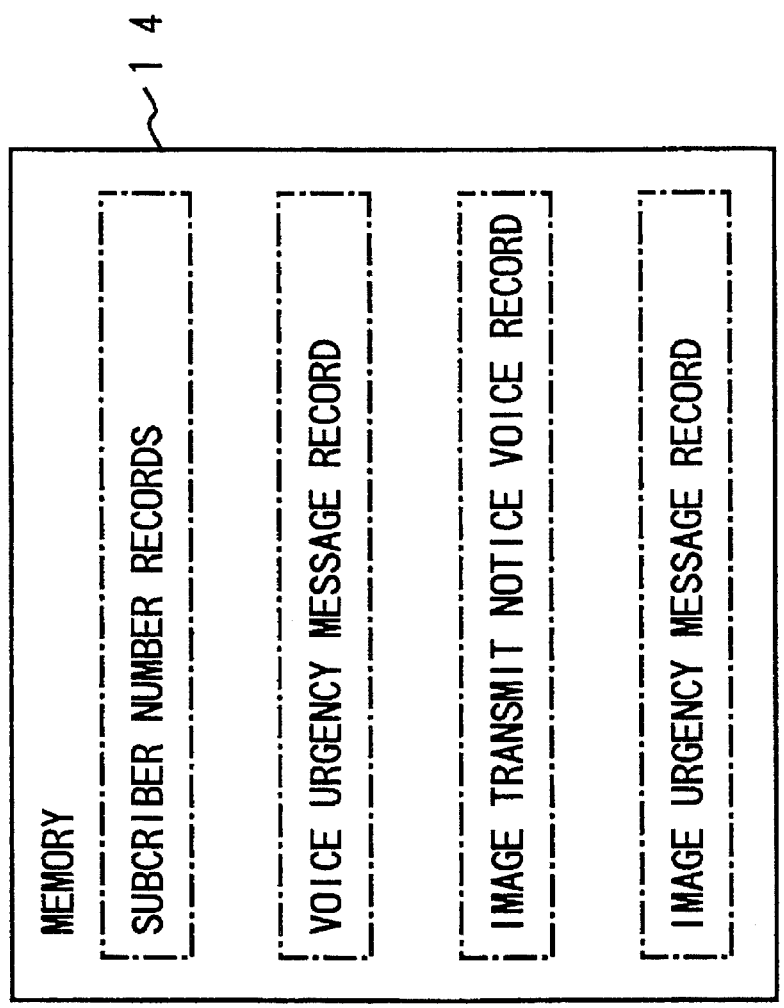
FIG. 4 is a diagram showing the contents of records stored in the memory unit.

FIG. 4 shows the contents of records which are stored in the memory unit 14 of the facsimile apparatus. As shown in FIG. 4, in the memory unit 14, four kinds of the urgency message records are stored which are the subscriber number records, the voice urgency message record, the image transmit notice voice record, and the image urgency message record described above.

An operator carries the radio transmitter 11 when the operator goes to a location remote from the facsimile apparatus. If a matter of urgency takes place to the operator, the urgency message transmission start operations are performed by the operator on the message transmit operation part MO of the radio transmitter 11 by turning ON one of the destination buttons B1 through B6 and setting one of the three modes of the select switch SW.

Next, a description will be given of an urgency message transmit procedure performed by the facsimile apparatus according to the present invention, with reference to FIGS. 5A through 5D. This urgency message transmit procedure is divided into four parts and they are respectively shown in FIGS. 5A through 5D.

Figure 5A:
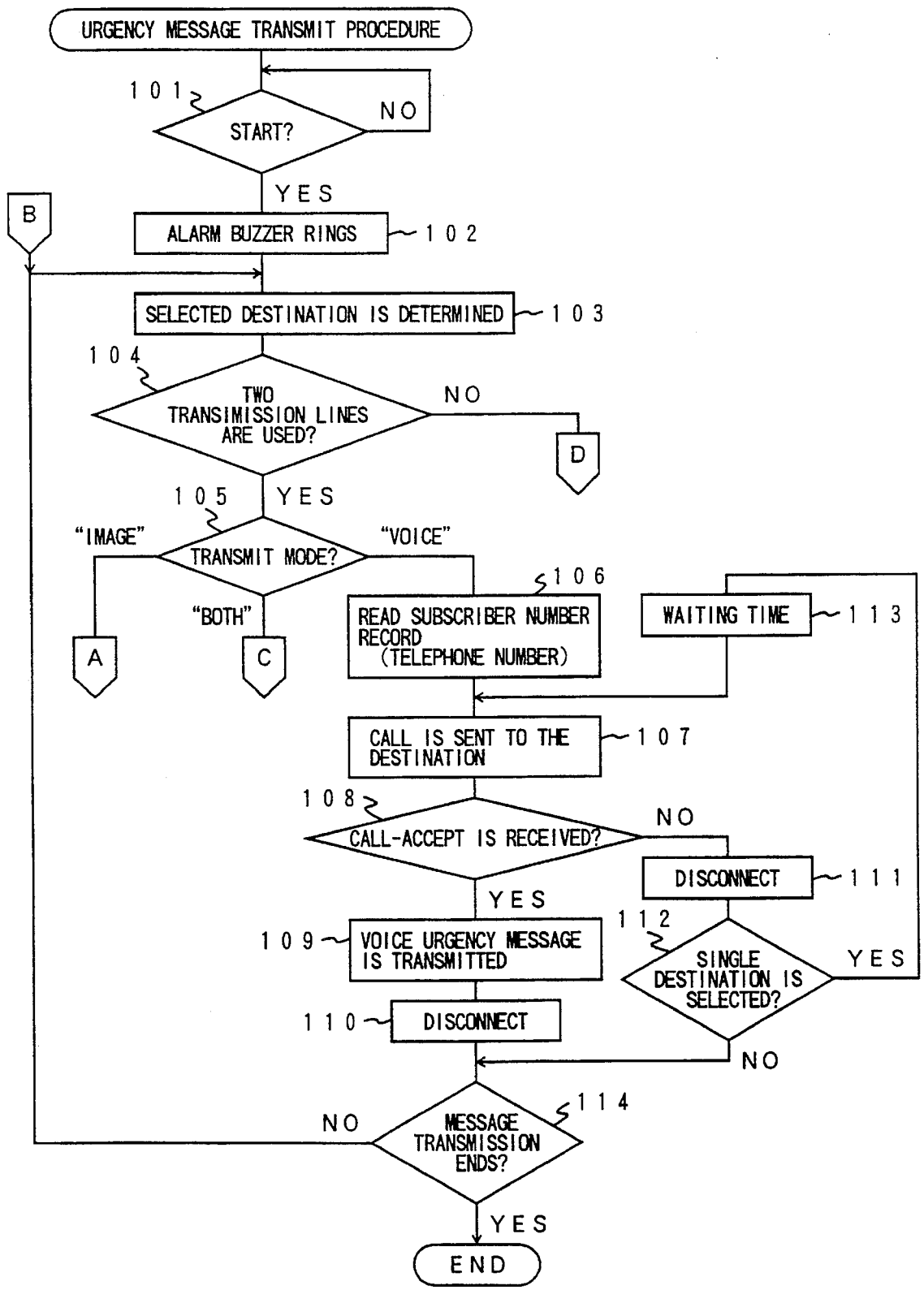
FIGS. 5A through 5D are a flow chart for explaining an urgency message transmit procedure performed by the facsimile apparatus.

In FIG. 5A, step 101 detects whether or not the urgency message transmit procedure by the facsimile apparatus is started. That is, the system control unit 16 constantly monitors the start of the urgency message transmit procedure. When the urgency message transmit procedure is started, step 102 allows the alarm buzzer 15 to ring. If anyone else within the user building hears a ringing sound of the alarm buzzer 15, the ringing of the alarm buzzer 15 informs that a matter of urgency has occurred to the operator.

After the above step 102 is performed, step 103 detects which one of the destination buttons B1 through B6 of the message transmit operation part MO is selected by the operator, to determine the selected destination to which the operator wishes to transmit the urgency message.

In the above step 103, when one of the destination buttons B1 through B5 is found to be ON, a corresponding single destination among the destinations A through E is determined as being the selected destination. When the destination button B6 is found to be ON, it is determined that all the destinations A through E are selected. In the latter case, the destination A is considered the first destination to which the urgency message is first transmitted. Also, in the latter case, the performance of the step 103 will be repeated until the destination E is considered the last destination to which the urgency message is finally transmitted.

After the above step 103 is performed, step 104 detects whether or not the selected destination is equipped with two transmission lines separately used by a telephone unit and a facsimile unit.

If the result at step 104 is affirmative, step 105 detects which one of the three transmit modes (the voice message transmit mode, the image message transmit mode, and the voice and image message transmit mode) on the select switch SW is selected by the operator, to determine the selected mode among the three transmit modes.

If the result at step 105 is the voice message transmit mode being selected by the operator, a voice urgency message transmit procedure including steps 106 through 114 in FIG. 5A will be performed by the system control unit 16. A description will now be given of this voice urgency message transmit procedure.

Step 106 reads out a subscriber number record of the selected destination from the memory unit 14. The read-out subscriber number record at this time is a telephone number assigned to a telephone unit of the selected destination. Step 107 sends a call from the facsimile apparatus to the telephone unit of the selected destination through a transmission line by using the read-out subscriber number record.

After the above step 107 is performed, step 108 detects whether or not the facsimile apparatus receives a call-accept signal from the telephone unit of the selected destination within a given time period.

If the result at step 108 is affirmative, it is determined that the facsimile apparatus can communicate with the telephone unit of the selected destination via the transmission line. Step 109 transmits the voice urgency message, whose record is stored in the memory unit 14, to the telephone unit of the selected destination via the transmission line. At this time, an operator at the selected destination may hear the transmitted voice urgency message on the telephone unit. After the above step 109 is performed, step 110 disconnects the facsimile apparatus from the transmission line which was connected with the telephone unit of the selected destination.

After the above step 110 is performed, step 114 detects whether or not the urgency message transmit procedure is completed. When the single destination is selected and the voice urgency message transmission is completed, it is determined that the urgency message transmit procedure is completed. At this time, the result at step 114 is affirmative and the voice urgency message transmit procedure ends.

If the result at step 108 is negative, it is determined that the telephone unit of the selected destination is now busy and the facsimile apparatus cannot communicate with the telephone unit via the transmission line. Step 111 disconnect the facsimile apparatus from the transmission line.

After the above step 111 is performed, step 112 detects whether a single destination is selected by the operator. When one of the destination buttons. B1 through B5 on the message transmit operation part MO is turned ON by the operator, it is determined that the single destination is selected. On the other hand, when the destination button B6 on the message transmit operation part MO is turned ON by the operator, it is determined that all the destinations A through E are selected.

If the result at step 112 is affirmative, step 113 sets the facsimile apparatus to a waiting condition for a given waiting time. After the step 113 is performed, the step 107 described above is performed again. Thus, a calling procedure to call the telephone unit of the selected destination is repeated until a call-accept signal from the destination is received.

If the result at step 112 is negative, it is determined that all the destinations A through E are selected. At this time, the result at the above step 114 is negative. Thus, the control of the system control unit 16 is transferred to the above step 103 again until the urgency message transmit procedures for all the destinations A through E are completed. On the other hand, when the urgency message transmit procedures for all the destinations A through E are completed, the result at the above step 114 is affirmative, and the voice urgency message transmit procedure ends.

More specifically, when all the destinations A through E are selected, the facsimile apparatus according to the present invention uses a transmitted message management table in the memory unit 14 to monitor the results of urgency message transmissions. FIG. 6 shows such a transmitted message management table used by the facsimile apparatus.

When the system control unit 16 detects that the transmitted message management table contains a destination to which a corresponding urgency message is not successfully transmitted ("NG" in FIG. 6), the result at the above step 114 is negative. As described above, the control of the system control unit 16 at this time is transferred to the above step 103. The above step 103 then selects the destination to which the urgency message is not yet transmitted according to the transmitted message management table. The subsequent steps which are the same as described above are performed for the above destination to which the urgency message is not yet transmitted.

When the urgency message transmit procedures for all the destinations A through E are completed, the result at the above step 114 is affirmative, and the voice urgency message transmit procedure ends.

Figure 5B:
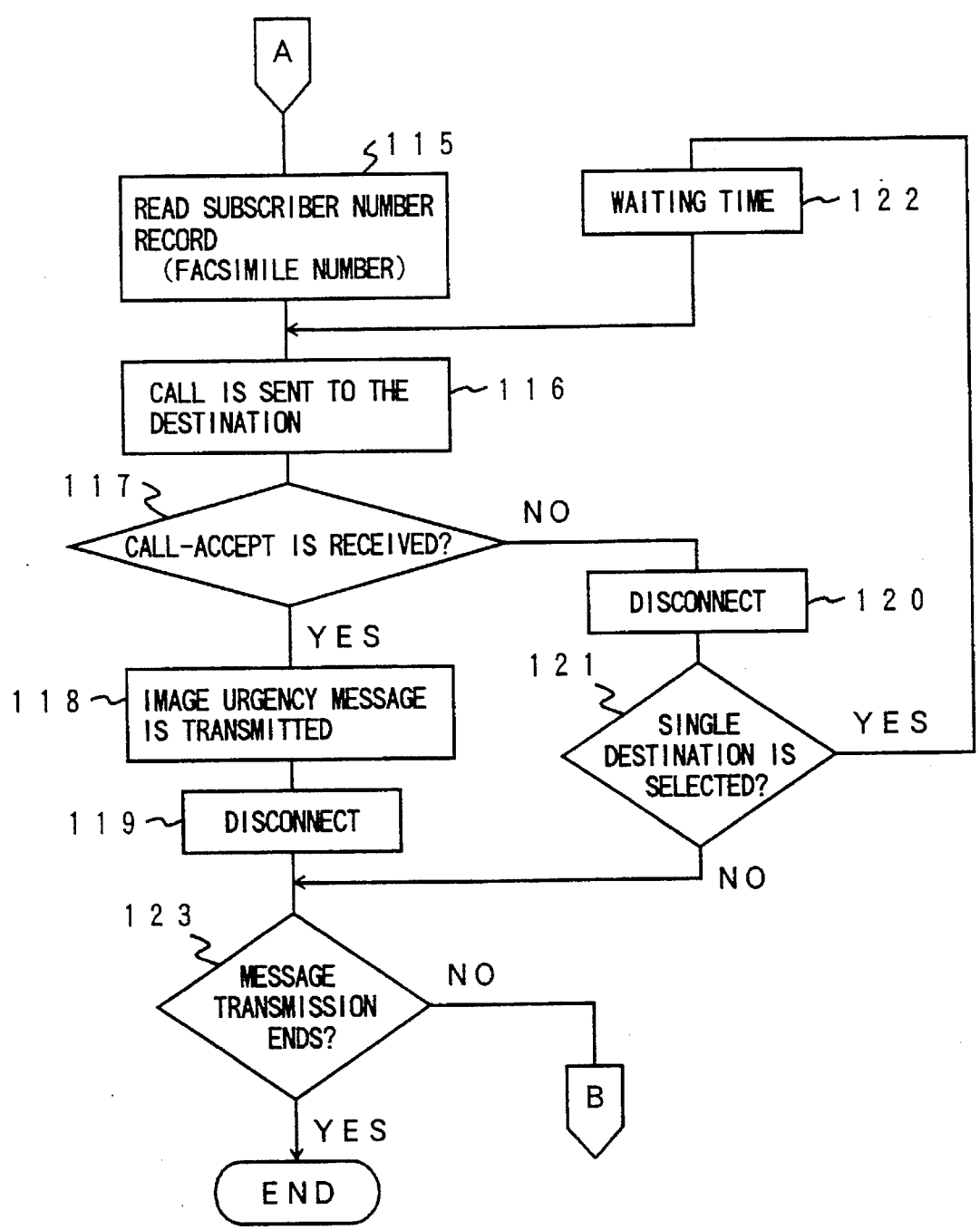

On the other hand, when the result at step 105 is the image message transmit mode being selected by the operator, an image urgency message transmit procedure including steps 115 through 123 in FIG. 5B will be performed by the system control unit 16. A description will now be given of this image urgency message transmit procedure with reference to FIG. 5B.

Step 115 reads out a subscriber number record of the selected destination from the memory unit 14. The read-out subscriber number record at this time is a facsimile number assigned to a facsimile unit of the selected destination. Step 116 sends a call from the facsimile apparatus to the facsimile unit of the selected destination through a transmission line by using the read-out subscriber number record.

After the above step 116 is performed, step 117 detects whether or not the facsimile apparatus receives a call-accept signal from the facsimile unit of the selected destination within a given time period.

If the result at step 117 is affirmative, it is determined that the facsimile apparatus can communicate with the facsimile unit of the selected destination via the transmission line. Step 118 transmits the image urgency message, whose record is stored in the memory unit 14, to the facsimile unit of the selected destination via the transmission line. At this time, an operator at the selected destination may see the printed image urgency message on the facsimile unit. After the above step 118 is performed, step 119 disconnects the facsimile apparatus from the transmission line which was connected with the facsimile unit of the selected destination.

After the above step 119 is performed, step 123 detects whether or not the urgency message transmit procedure is completed. When the single destination is selected and the image urgency message transmission is completed, it is determined that the urgency message transmit procedure is completed. At this time, the result at step 123 is affirmative and the image urgency message transmit procedure ends.

If the result at step 117 is negative, it is determined that the facsimile unit of the selected destination is now busy and the facsimile apparatus cannot communicate with the facsimile unit via the transmission line. Step 120 disconnects the facsimile apparatus from the transmission line.

After the above step 120 is performed, step 121 detects whether or not a single destination is selected by the operator.

If the result at step 121 is affirmative, step 122 sets the facsimile apparatus to the waiting condition for the given waiting time. After the step 122 is performed, the step 116 described above is performed again. Thus, a calling procedure to call the facsimile unit of the selected destination is repeated until a call-accept signal from the destination is received.

If the result at step 121 is negative, it is determined that all the destinations A through E are selected by the operator. At this time, the result at the above step 123 is negative. Thus, the control of the system control unit 16 is transferred to the above step 103 in FIG. 5A again until the urgency message transmit procedures for all the destinations A through E are completed.

On the other hand, when the urgency message transmit procedures for all the destinations A through E are completed, the result at the above step 123 is affirmative, and the image urgency message transmit procedure ends.

As described above, when all the destinations A through E are selected, a transmitted message management table in the memory unit 14 as shown in FIG. 6 is used to monitor the results of urgency message transmissions. If the transmitted message management table includes a destination to which the image urgency message is not yet transmitted, the result at step 123 is negative. The control of the system control unit 16 is transferred to the above step 103 in FIG. 5A.

When the urgency message transmit procedures for all the destinations A through E are completed according to the transmitted message management table, the result at the above step 123 is affirmative, and the image urgency message transmit procedure ends.

Figure 5C:
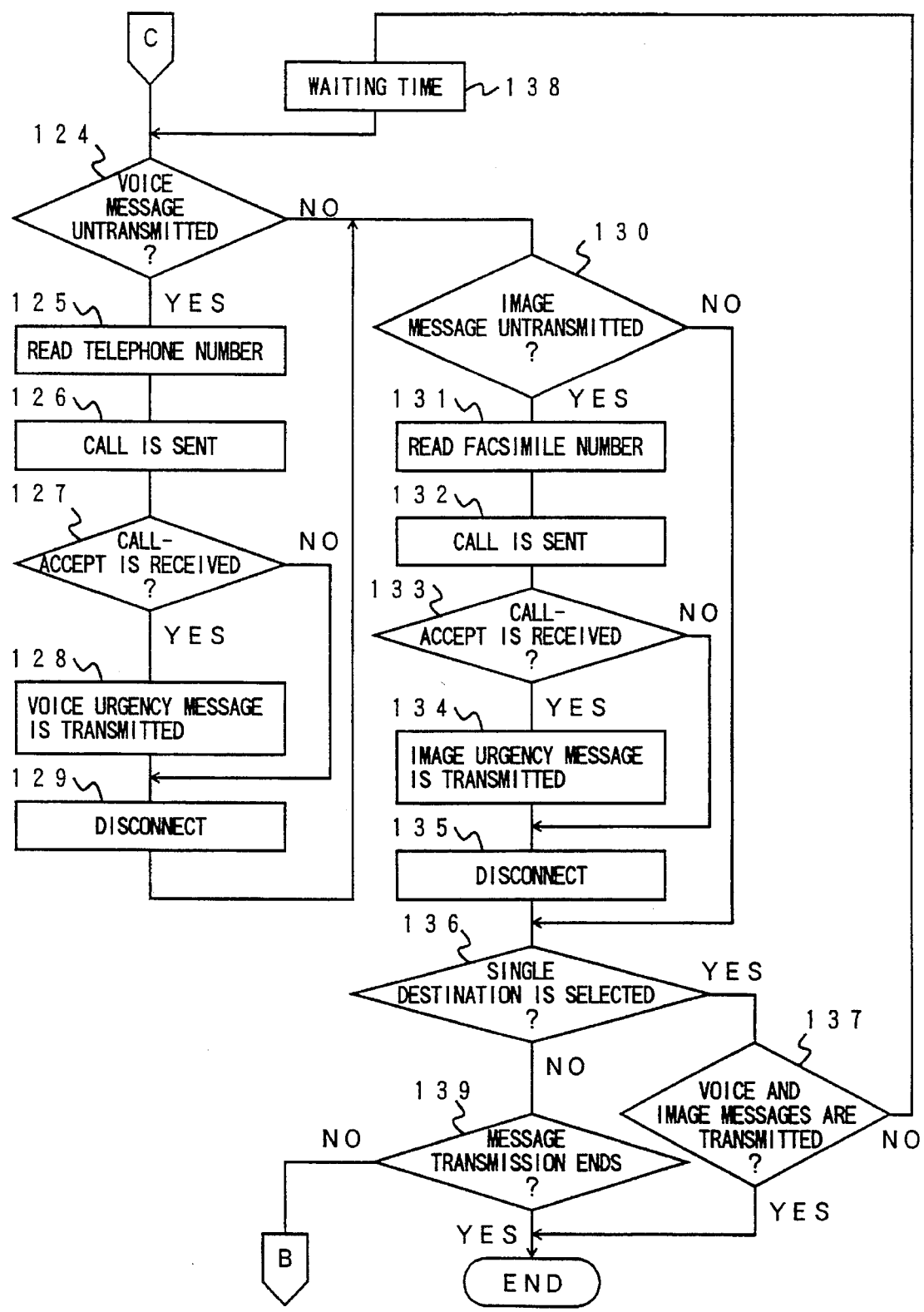
Figure 5D:
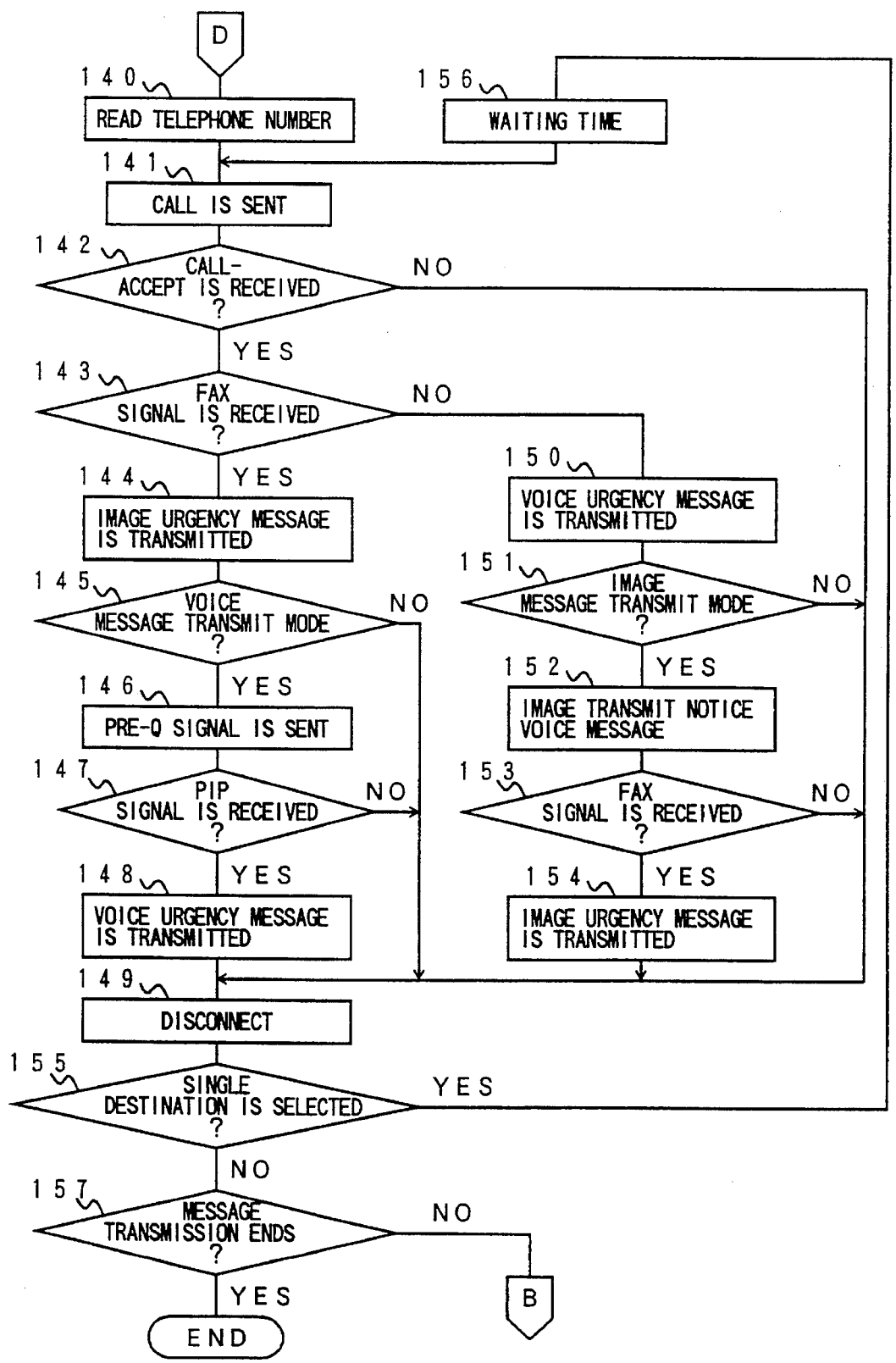

On the other hand, when the result at step 105 in FIG. 5A is the voice and image message transmit mode being selected by the operator, a voice/image urgency message transmit procedure including steps 124 through 139 in FIG. 5C is performed by the system control unit 16. A description will now be given of this voice/image urgency message transmit procedure with reference to FIG. 5C.

Step 124 detects whether a transmission of a voice urgency message to the selected destination is unperformed. At the start of the voice/image urgency message transmit procedure, the voice urgency message transmission is unperformed, and the result at step 124 is affirmative. Step 125 reads out a telephone number record of the selected destination from the memory unit 14. Step 126 sends a call from the facsimile apparatus to the telephone unit of the selected destination through a transmission line by using the read-out subscriber number record.

On the other hand, when the result at step 124 is negative (the voice urgency message is already transmitted to the selected destination), step 130 is performed which will be described below.

After the above step 126 is performed, step 127 detects whether the facsimile apparatus receives a call-accept signal from the telephone unit of the selected destination within a given time period.

If the result at step 127 is affirmative, it is determined that the facsimile apparatus can communicate with the telephone unit of the selected destination via the transmission line. Step 128 transmits the voice urgency message, whose record is stored in the memory unit 14, to the telephone unit of the selected destination via the transmission line. After the above step 128 is performed, step 129 disconnects the facsimile apparatus from the transmission line which was connected with th telephone unit of the selected destination.

If the result at step 127 is negative, it is determined that the telephone unit of the selected destination is now busy and the facsimile apparatus cannot communicate with the telephone unit. The above step 129 is performed to disconnect the facsimile apparatus from the transmission line.

After the above step 129 is performed, step 130 detects whether a transmission of an image urgency message to the selected destination is unperformed. At the start of the voice/image urgency message transmit procedure, the image urgency message transmission is unperformed, and the result at step 130 is affirmative. Step 131 reads out a facsimile number record of the selected destination from the memory unit 14. Step 132 sends a call from the facsimile apparatus to the facsimile unit of the selected destination through a transmission line by using the read-out subscriber number record.

After the above step 132 is performed, step 133 detects whether the facsimile apparatus receives a call-accept signal from the facsimile unit of the selected destination within a given time period.

If the result at step 133 is affirmative, it is determined that the facsimile apparatus can communicate with the facsimile unit of the selected destination via the transmission line. Step 134 transmits the image urgency message, whose record is stored in the memory unit 14, to the facsimile unit of the selected destination via the transmission line. After the above step 134 is performed, step 135 disconnects the facsimile apparatus from the transmission line which was connected with the facsimile unit of the selected destination.

If the result at step 133 is negative, the above step 135 is performed to disconnect the facsimile apparatus from the transmission line.

After the above step 135 is performed, step 136 detects whether a single destination is selected by the operator.

If the result at step 136 is affirmative (the single destination is selected), step 137 detects whether both the voice and image urgency messages are transmitted to the selected destination.

When one or both of the voice and image urgency messages are untransmitted to the selected destination, the result at step 137 is negative. In this case, step 138 sets the facsimile apparatus to the waiting condition for the given waiting time. After the step 138 is performed, the above step 124 is performed again, so that the above described message transmission is performed for the untransmitted message.

When a single destination is selected and both the voice and image urgency messages are transmitted to the selected destination, the result at step 137 is affirmative. In this case, the voice/image urgency message transmit procedure ends.

If the result at step 136 is negative, it is determined that all the destinations A through E are selected by the operator. At this time, step 139 detects whether the voice/image urgency message transmit procedures for all the destinations A through E are completed. When this step 139 is performed, the system control unit 16 uses a transmitted message management table in the memory unit 14 as shown in FIG. 7 to monitor the results of urgency message transmissions. If the transmitted message management table includes a destination ("NG" in FIG. 7) to which any urgency message is not yet transmitted, the result at step 139 is negative. The control of the system control unit 16 is transferred to the above step 103 in FIG. 5A, so that the urgency message transmission is performed for the untransmitted urgency message.

On the other hand, when the urgency message transmit procedures for all the destinations A through E are completed, the result at step 139 is affirmative, and the voice/image urgency message transmit procedure ends.

If the result at the above step 104 in FIG. 5A is negative, it is determined that the selected destination is equipped with a single transmission line shared by a telephone unit and a facsimile unit. In this case, an urgency message transmit procedure for the telephone/facsimile destination station is carried out by the system control unit 16. A description will be given of this procedure including steps 140 through 157 with reference to FIG. 5D.

Step 140 reads out a subscriber number record (the telephone number) of the selected destination from the memory unit 14. Step 141 sends a call from the facsimile apparatus to the telephone unit of the selected destination through a transmission line by using the read-out telephone number.

After the above step 141 is performed, step 142 detects whether or not the facsimile apparatus receives a call-accept signal from the telephone unit of the selected destination within a given time period.

If the result at step 142 is affirmative, step 143 detects whether or not the facsimile apparatus receives a facsimile signal such as CED signal from the selected destination within a given time period after the end of the step 142. If the result at step 143 is affirmative, it is determined that the facsimile apparatus can communicate with the facsimile unit of the selected destination via the transmission line. Step 144 transmits the image urgency message to the facsimile unit of the selected destination via the transmission line.

After the above step 144 is performed, step 145 detects whether the voice message transmit mode is selected by the operator on the message transmit operation part MO. If the result at step 145 is affirmative, step 146 sends a PRE-Q signal from the facsimile apparatus to the facsimile unit of the selected destination.

Generally, according to the G3 facsimile transmission control procedure, a facsimile unit generates an alarm sound to inform the user at the facsimile unit when it receives a PRE-Q signal from an external station via a telephone line. If a telephone set of the facsimile unit is set to an off-hook condition by the user, the facsimile unit sends a PIP signal or a PIN signal to the external station, and the telephone set is connected with the telephone line.

Therefore, after the above step 146 is performed, an operator at the facsimile unit of the selected destination hears the alarm sound generated by the facsimile unit and sets the telephone unit of the selected destination to an off-hook condition. If the telephone unit is set by the operator to the off-hook condition, the PIP signal or the PIN signal is sent from the facsimile unit of the selected destination to the facsimile apparatus, and the telephone unit is connected with the transmission line. Step 147 detects whether the facsimile apparatus receives the PIP signal or the PIN signal from the selected destination.

If the result at step 147 is affirmative, step 148 transmits the voice urgency message to the telephone unit of the selected destination via the transmission line. After the step 148 is performed, step 149 disconnects the facsimile apparatus from the transmission line.

When the result at step 145 is negative (the voice message transmit mode is not selected) or when the result at step 147 is negative (the PIP signal is not received), the facsimile apparatus is disconnected from the transmission line at step 149 and the above steps 146 and 148 are not performed. disconnects the facsimile apparatus from the transmission line which was connected with th telephone unit of the selected destination.

On the other hand, when the result at step 143 is negative (the facsimile signal from the selected destination is not received within the given time period), it is determined that the facsimile apparatus can communicate with the telephone unit of the selected destination only. Step 150 transmits the voice urgency message to the telephone unit of the selected destination via the transmission line. An operator at the telephone unit of the selected destination may hear the voice urgency message supplied from the facsimile apparatus.

After the above step 150 is performed, step 151 detects whether the image urgency message transmit mode is selected by the operator on the message transmit operation part MO. If the result at step 151 is affirmative, step 152 transmits the image transmit notice voice message to the telephone unit of the selected destination via the transmission line. An operator at the telephone unit of the selected destination who hears the image transmit notice voice message will press the facsimile start button to start the facsimile operation of the facsimile unit.

After the above step 152 is performed, step 153 detects whether the facsimile apparatus receives a facsimile signal from the facsimile unit of the selected destination. If the result at step 153 is affirmative, step 154 transmits the image urgency message to the facsimile unit of the selected destination via the transmission line.

After the above step 154 is performed, the facsimile apparatus is disconnected from the transmission line at step 149. Also, when the result at step 142, step 151 or step 153 is negative, the facsimile apparatus is immediately disconnected from the transmission line at step 149.

After the facsimile apparatus is disconnected at the above step 149, step 155 detects whether a single destination is selected by the operator on the message transmit operation part MO.

If the result at step 155 is affirmative, step 156 sets the facsimile apparatus to the waiting condition for the given waiting time. After the step 156 is performed, the above step 141 is performed again. The calling procedure to call the telephone unit of the selected destination is repeated.

If the result at step 155 is negative, it is determined that all the destinations A through E are selected. Step 157 detects whether or not the urgency message transmit procedures for all the destinations A through. E are completed. When the result at step 157 is negative, the control of the system control unit 16 is transferred to the above step 103, so that the urgency message transmit procedures for the subsequent destinations are repeated.

On the other hand, when the result at step 157 is affirmative, it is determined that the urgency message transmit procedures for all the destinations A through E are completed, and the voice urgency message transmit procedure ends.

In the above described embodiment, when the urgency message transmit procedure is started, one of the recorded destination stations is selected by the operator on the message transmit operation part MO and one of the message transmit modes is selected by the operator thereon. Thus, it is possible that the operator changes the selected destination station according to the kind of the urgency and changes the selected message transmit mode according to the equipment of the destination station.

For example, the operator at the facsimile apparatus can select a police station as the destination station for urgency message transmission when a trouble happens to the operator, and can select a fire station as the destination station when a fire of the user building takes place. In addition, the operator can select the voice message transmit mode when the destination station is equipped with a telephone unit only, and can select the voice and image message transmit mode when the destination station is equipped with both a telephone unit and a facsimile unit.

Further, in the above described embodiment, when a matter of urgency to the operator takes place at a location remote from the facsimile apparatus, the operator can select one of the destination stations and one of the message transmit modes on the message transmit operation part MO of the radio transmitter 11. In such a case, an urgency message transmission start signal is sent from the radio transmitter 11 to the facsimile apparatus, and the urgency message transmit procedure is carried out by the facsimile apparatus in a manner which is the same as described above in conjunction with FIGS. 5A through 5D.

Next, a description will be given of an urgency message transmit procedure performed by the facsimile apparatus when a call from an external facsimile station is received after the start of the urgency message transmit procedure, with reference to FIG. 8.

Figure 8:
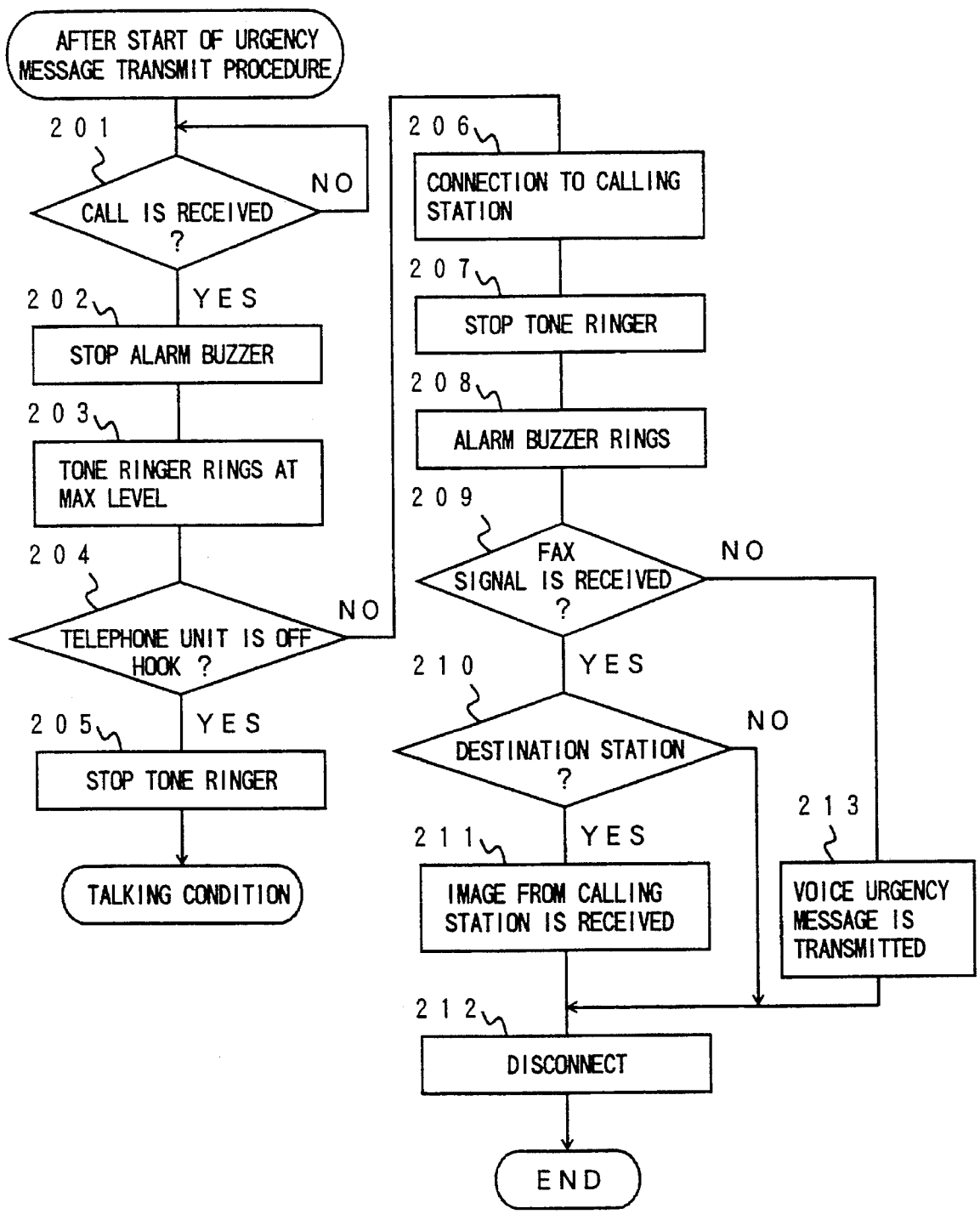
FIG. 8 is a flow chart for explaining an urgency message transmit procedure performed by the facsimile apparatus when a call from an external facsimile station is received after the start of the urgency message transmit procedure.

FIG. 8 shows the urgency message transmit procedure described above. The system control unit 16 of the facsimile apparatus constantly monitors reception of a call from an external station after the start of the urgiency message transmit procedure and before the connection of the facsimile apparatus to a transmission line.

In FIG. 8, step 201 detects whether or not a call from an external station is received after the start of the urgency message transmit procedure and before the connection of the facsimile apparatus to a transmission line.

If the result at step 201 is affirmative, the call from the external station is received. Step 202 stops the alarm buzzer 15 from ringing. The ringing of the alarm buzzer 15 is previously started at the step 102 in FIG. 5A to inform the start of the urgency message transmit procedure.

After the step 202 is performed, step 203 allows the tone ringer 9 to ring at the maximum volume level during a given ringing time when the call from the external station is received after the start of the urgency message transmit procedure, in order to inform the reception of the call to the operator at the facsimile apparatus. The system control unit 16 at this time sets the ringing sound of the tone ringer 9 to the maximum volume level regardless of which volume level the ringing sound of the tone ringer is set to by the operator.

Step 204 detects whether or not the telephone unit 6 is set to an off-hook condition within a given time period after the reception of the call from the external station.

If the operator can talk in response to the calling station in spite of the matter of the urgency, the operator sets the telephone unit 6 to the off-hook condition within the given time period and the result at step 204 is affirmative. At this time, the system control unit 16 stops the tone ringer 9 from generating the ringing sound at step 205. The telephone unit 6 of the facsimile apparatus is connected to the transmission line so that the operator can talk on the telephone unit 6 to the calling station.

If the operator does not set the telephone unit 6 to the off-hook condition within the given time period, the result at step 204 is negative. At this time, the system control unit 16 automatically sends a call-accept signal back to the calling station, and the facsimile apparatus is connected to the calling station through the transmission line at step 206. Step 207 stops the tone ringer 9 from ringing, and step 208 re-starts the alarm buzzer 15 to generate the alarm sound.

After the above step 208 is performed, step 209 detects whether the facsimile apparatus receives a facsimile signal from the calling station within a given time period.

If the calling station is an external facsimile station, the result at step 209 is affirmative. The facsimile apparatus at this time performs the G3 facsimile receiving procedure. That is, the facsimile apparatus receives a DCS signal from the calling station according to the G3 facsimile receiving procedure, and the facsimile apparatus obtains a subscriber number of the calling station from the received DCS signal. The system control unit 16 of the facsimile apparatus compares the subscriber number of the calling station with the subscriber number records of the selected destination stored in the memory unit 14. Step 210 detects whether the calling station is one of the destination stations to which the image urgency message is previously transmitted from the facsimile apparatus.

If the result at step 210 is affirmative, the facsimile apparatus continuously carries out the G3 facsimile receiving procedure so that an image from the calling facsimile station is received via the transmission line at step 211. After the step 211 is performed, step 212 disconnects the facsimile apparatus from the transmission line. The G3 facsimile receiving procedure by the facsimile apparatus is completed.

If the result at step 210 is negative, the facsimile apparatus is disconnected from the transmission line at the step 212, and the step 211 is not performed.

On the other hand, if the calling station is not an external facsimile station, the result at step 209 is negative. Step 213 transmits the voice urgency message to the calling station via the transmission line. After the step 213 is performed, the facsimile apparatus is disconnected from the transmission line at the step 212, and the G3 facsimile receiving procedure by the facsimile apparatus ends.

If some steps in the urgency message transmit procedure in FIGS. 5A through 5D are not yet completed after the above step 212 is performed, the performance of the steps is re-started and completed.

In the above described embodiment, when a call from an external calling station is received after the start of the urgency message transmit procedure, the facsimile apparatus enables the tone ringer 9 to ring during a given ringing time. The operator can respond to the calling station by telephone by setting the telephone unit 6 to the off-hook condition, if possible. When the calling station is detected to be an external facsimile unit and the operator does not respond to the calling station within the ringing time, the facsimile apparatus is immediately disconnected from the transmission line, so that the urgency message transmit procedure is smoothly and quickly carried out by the facsimile apparatus.

In addition, in the above described embodiment, when the calling station is detected to be an external facsimile unit and it is detected at the same time to be one of the destination stations to which the image urgency message is previously transmitted, the facsimile apparatus receives an image from the calling station via the transmission line. The operator at the facsimile apparatus can see the image received from the destination station (or the calling station) after the image urgency message is transmitted thereto.

Further, the present invention is not limited to the above described embodiments, and various variations and modifications may be made without departing from the scope of the present invention.

What is claimed is:

1. A facsimile apparatus having an urgency message transmission function, comprising:

memory means for storing a plurality of subscriber number records indicating a plurality of destination stations, and for storing voice and image urgency message records which respectively indicate voice and image urgency messages;

operation means provided within said facsimile apparatus for selecting one of the plurality of destination stations whose records are stored in said memory means, and for selecting one of a plurality of message transmit modes;

transmission starting means for starting an urgency message transmit procedure when one of the destination stations is selected by said operation means and one of the plurality of message transmit modes is selected by said operation means; and transmission means for transmitting an urgency message to the selected destination station through a transmission line when the urgency message transmit procedure is performed in accordance with the selected message transmit mode, said urgency message being either or both of said stored voice and image urgency messages selected in accordance with the selected message transmit mode, wherein said apparatus further comprises radio transmitter means, provided outside said facsimile apparatus, for transmitting a signal from a remote location to said facsimile apparatus through a radio wave transmission, said radio transmitter means including an operation part for selecting one of the plurality of destination stations and for selecting one of the plurality of message transmit modes, wherein said transmission starting means starts the urgency message transmit procedure in response to said transmitted start signal from said radio transmitter means, said transmission means transmitting either or both of said stored voice and image urgency messages to the destination station selected by said operation part, said transmitted message being selected in accordance with the message transmit mode selected by said operation part.

2. A facsimile apparatus according to claim 1, wherein said transmission means transmits the voice urgency message to the selected destination station when a voice message transmit mode is selected by said operation means, said transmission means transmits the image urgency message to the selected destination station when an image message transmit mode is selected on said operation means, and said transmission means transmits both the voice and image urgency messages to the selected destination station when a voice and image message transmit mode is selected on said operation means.

3. A facsimile apparatus according to claim 2, further comprising means for transmitting the image urgency message to the selected destination station when the voice message transmit mode is selected by said operation means and a facsimile signal from a facsimile unit of the selected destination station is received within a predetermined time period.

4. A facsimile apparatus according to claim 2, further comprising means for transmitting the voice urgency message to the selected destination station when the image message transmit mode is selected by said operation means and a facsimile signal from the selected destination station is not received within a predetermined time period.

5. A facsimile apparatus according to claim 1, wherein said operation means comprises a selection button for selecting all of the destination stations when said selection button is turned on, the transmission of the urgency message being repeated by said transmission means until the urgency message is transmitted to all of the destination stations.

6. A facsimile apparatus having an urgency message transmission function, comprising:

memory means for storing a plurality of subscriber number records indicating a plurality of destination stations for urgency message transmission, and for storing voice and image urgency message records which respectively indicate voice and image urgency messages;

operation means for selecting one of the plurality of destination stations whose records are stored in said memory means, and for selecting one of a plurality of message transmit modes;

transmission starting means for starting an urgency message transmit procedure when one of the destination stations is selected on said operation means and one of the plurality of message transmit modes is selected on said operation means;

transmission means for transmitting an urgency message to the selected destination station through a transmission line when the urgency message transmit procedure is started by said transmission starting means, said urgency message being one or both of said voice and image urgency messages in accordance with the selected message transmit mode;

a tone ringer;

ringing sound generate means for enabling said tone ringer to generate a ringing sound during a given ringing time when a call from an external calling station is received after the start of the urgency message transmit procedure;

response means for automatically sending a call-accept signal to the calling station via a transmission line when a reply signal from a telephone unit of the facsimile apparatus is not sent to the calling station within the given ringing time;

detection means for detecting whether the calling station is a facsimile unit or a telephone unit after a signal from the calling station is received;

voice message transmit means for transmitting the voice urgency message to the calling station when the calling station is detected to be a telephone unit; and disconnect means for disconnecting the facsimile apparatus from the transmission line when the calling station is detected to be a facsimile unit.

7. A facsimile apparatus according to claim 6, further comprising receiving means for receiving an image from the calling station via the transmission line, prior to the disconnection of the facsimile apparatus by said disconnect means, when the calling station is detected to be a facsimile unit but is detected to be one of the destination stations to which the image urgency message from said facsimile apparatus is previously transmitted.

8. A facsimile apparatus according to claim 6, wherein said ringing sound generate means comprises means for setting the ringing sound of the tone ringer to a maximum volume level regardless of which volume level the ringing sound of the tone ringer is set to by the operator.

9. A facsimile apparatus according to claim 6, further comprising:

an alarm buzzer;

alarm sound generate means for enabling said alarm buzzer to generate an alarm sound at the same time as the start of the urgency message transmit procedure; and alarm sound stop means for stopping said alarm buzzer from generating the alarm sound during the given ringing time of the tone ringer.

* * * * *